US006195182B1

United States Patent
Kunishige

(10) Patent No.: US 6,195,182 B1
(45) Date of Patent: Feb. 27, 2001

(54) SCANNER HAVING A UNIT FOR IDENTIFYING A TYPE OF FILM HOLDING UNIT

(75) Inventor: Keiji Kunishige, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/712,874

(22) Filed: Sep. 12, 1996

(30) Foreign Application Priority Data

Sep. 18, 1995 (JP) .................................................. 7-238618

(51) Int. Cl.[7] ......................................................... H04N 1/04
(52) U.S. Cl. ............................ 358/487; 358/488; 358/498
(58) Field of Search ................................. 358/487, 474, 358/506, 505, 488, 498, 494, 408, 404, 909; 353/101; 352/140, 131; 348/96, 97, 98; 355/75, 55–63

(56) References Cited

U.S. PATENT DOCUMENTS

| 5,161,026 | * | 11/1992 | Mabuchi et al. | 358/909 |
|---|---|---|---|---|
| 5,327,259 | * | 7/1994 | Furusawa | 358/474 |
| 5,394,205 | * | 2/1995 | Ochiai et al. | 353/101 |
| 5,754,314 | * | 5/1998 | Araki et al. | 358/487 |
| 5,767,989 | * | 6/1998 | Sakaguchi | 358/474 |
| 5,838,464 | * | 11/1998 | FredLund et al. | 358/498 |
| 6,078,409 | * | 6/2000 | Kunishige | 358/487 |

FOREIGN PATENT DOCUMENTS 5-145837   6/1993  (JP) .

* cited by examiner

Primary Examiner—Cheukfan Lee
(74) Attorney, Agent, or Firm—Volpe and Koenig, P.C.

(57) ABSTRACT

A scanner having a film image fetching unit for reading images from developed film, a cartridge film holding unit and 135 film holding unit which are freely attachable or detachable to or from the film image fetching unit, a convex part formed on each of the cartridge film holding unit and 135 film holding unit, and a plurality of switches to be turned on or off when pressed by the convex part. Based on the outputs of the switches, the present or absence of a film holding unit or the type of mounted film holding unit is identified. The film image fetching unit performs inherent setting such as setting of a range of image reading according to the result of the identification.

26 Claims, 12 Drawing Sheets

SCANNER HAVING A UNIT FOR IDENTIFYING A TYPE OF FILM HOLDING UNIT

BACKGROUND OF THE INVENTION

1. Field of the Invention

The present invention relates to a scanner, or more particularly, to a scanner having a film image fetching unit and a film holding unit freely attachable or detachable to or from the film image fetching unit.

2. Description of the Related Art

Various kinds of scanners for reading images from a plurality of kinds of films such as a film stowed in a film cartridge, a strip film, and piece films have been proposed in the past. For example, Japanese Unexamined Patent Publication No. 5-145838 describes a film player comprising a first film holding means for holding a first developed film stowed in a cartridge, a second film holding means for holding a second developed film such as piece films and/or a film strip not stowed in the cartridge in the same manner as the first film, a film transportation means for transporting an image area recorded in the first or second film to a given imaging area, and a video signal reproducing means for reproducing the image in the image area as a video signal.

More particularly, the film player has a mechanical member including gears for feeding the film stowed in a cartridge to a given reading position, and a mechanical member including feed rollers for inserting piece films and/or film strips through insert ports and feeding an image on each piece film and/or strip to the given reading position. The film fed to the given reading position is illuminated by an illumination light source, and then an image is read from the film by a CCD.

However, the film player requires two film driving members associated with the respective films so as to handle the two kinds of films; the piece films and the film stowed in the cartridge. Spaces in which the film driving members are placed are accordingly needed.

Moreover, since feed positions are optically the same position, the restrictions imposed on the arrangement of the two mechanical members get greater. This invites an increase in both complexity and size of a scanner and becomes a factor of crippling the effort to make a scanner more compact. Furthermore, it becomes a cause of deteriorating the reliability of image fetching, and also becomes a factor of inviting an increase in total cost of a scanner.

As a means for solving the foregoing problems, the present applicant has proposed a scanner comprising a film image fetching unit and film holding units freely attachable or detachable to or from the film image fetching unit and associated with various kinds of films. According to the proposal, various kinds of films can be handled with a relatively simple configuration but the increase in size and complexity of a scanner will not be invited.

However, according to the foregoing configuration, every time film holding units are changed, a film driving sequence, a range of image fetching, and focus must be modified according to a new film holding unit. A user must therefore set a film image fetching unit according to the type of object film holding unit. It cannot be said that maneuverability is good.

OBJECTS AND SUMMARY OF THE INVENTION

A first object of the present invention is to provide a scanner with good maneuverability that does not require a user to set the type of film holding unit.

A second object of the present invention is to provide a scanner with good maneuverability that does not require a user to perform a setting operation dependent on the type of film holding unit.

A third object of the present invention is to provide a scanner with good maneuverability that does not require a user to set the scanner to indicate the kind of film to be scanned.

A fourth object of the present invention is to provide a scanner with good maneuverability that does not require a user to set a range of an image according to the type of film holding unit.

A fifth object of the present invention is to provide a scanner with good maneuverability that does not require a user to instruct a film feed operation after mounting an adaptor in a scanner main unit.

A sixth object of the present invention is to provide a scanner with good maneuverability in which inherent control dependent on the type of film holding unit is given automatically.

A seventh object of the present invention is to provide a scanner capable of taking measures properly even when the type of film holding unit cannot be identified.

Briefly, the present invention is concerned with a scanner having a film image fetching unit for reading images from developed film and a plurality of types of film holding units freely attachable or detachable to or from the film image fetching unit, and capable of identifying the types of film holding units.

These as well as other objects and advantages of the present invention will become further apparent from the following detailed explanation.

DESCRIPTION OF THE PREFERRED EMBODIMENTS

Figure 1:
FIG. 1 is a block diagram showing a major section of a scanner of a first embodiment of the present invention.

Referring to the drawings, embodiments of the present invention will be described below.

FIGS. 1 to 10 relate to the first embodiment of the present invention. FIG. 1 is a block diagram showing a major portion of a scanner.

The scanner comprises a film holding unit 2 that is an adaptor associated with a kind of film, a film image fetching unit 1 that is a scanner main unit for illuminating the film held by the film holding unit 2 and electrically fetching an image by photoelectric transfer, and a film holding unit identification means 3 for identifying the type of film holding unit 2 and outputting the film type to the film image fetching unit 1. Based on the output of the film holding unit identification means 3, a sequence associated with the film holding unit 2 or the kind of film held by the film holding unit 2 is executed: a range of image fetching performed by the film image fetching unit 1 is modified automatically; and focus dependent on the type of attached film holding unit 2 is carried out automatically.

Owing to the foregoing configuration, it becomes unnecessary for a user to set or adjust an object film every time a film is loaded or the film holding unit 2 is mounted. This results in improved maneuverability and ease of use.

Figure 2:
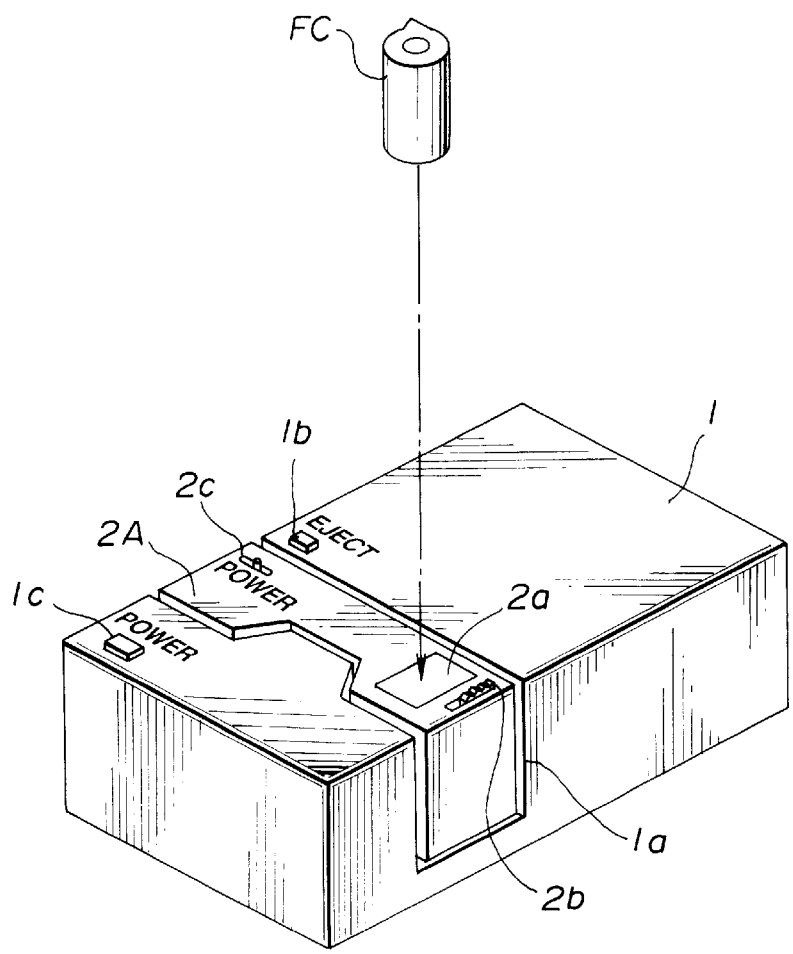
FIG. 2 is an oblique view showing the scanner of a first embodiment in which a film holding unit of the type of holding a cartridge film is mounted in a film image fetching unit.
Figure 3:
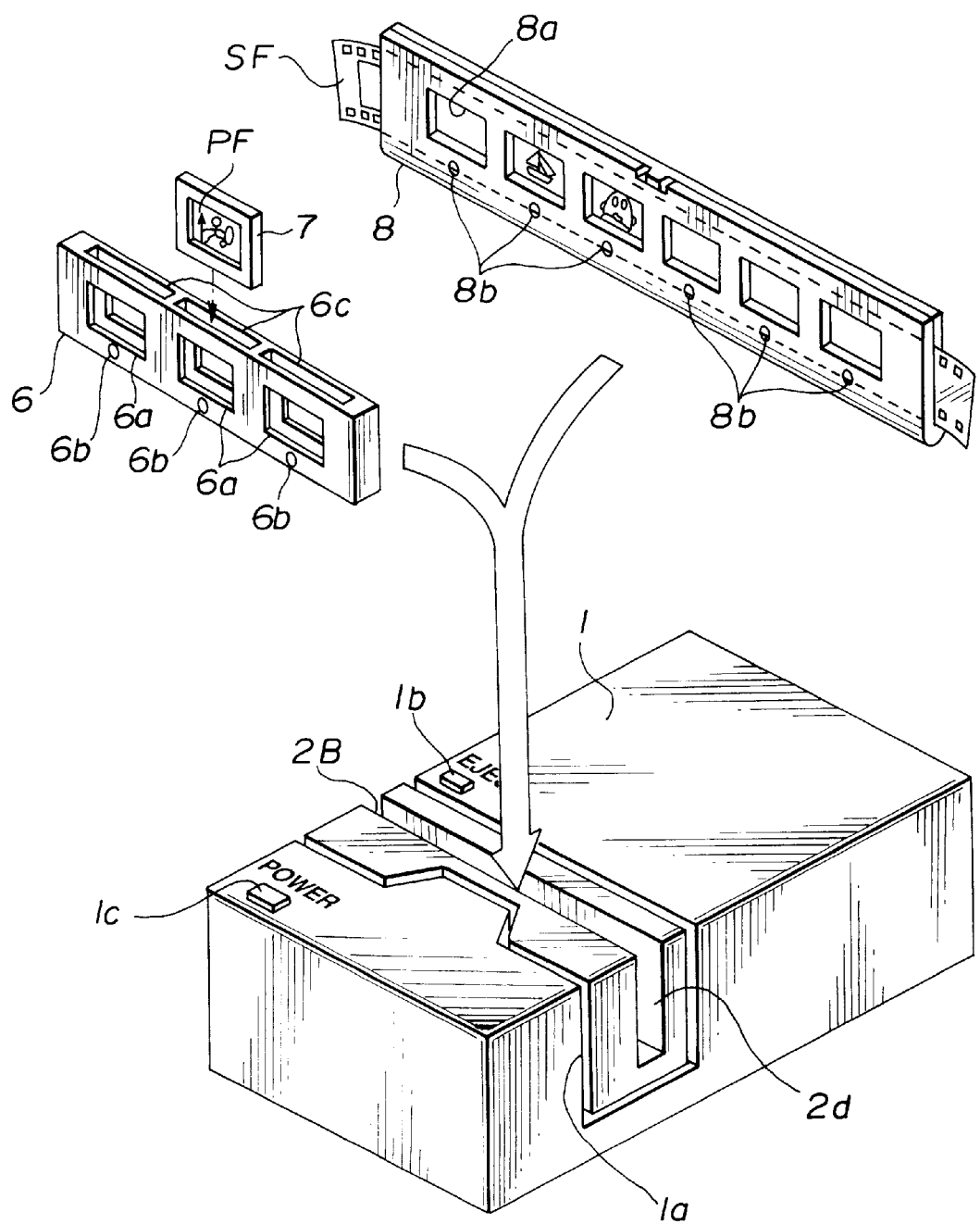
FIG. 3 is an oblique view showing the scanner of the first embodiment in which a film holding unit of the type of holding piece films or a strip film is mounted in the film image fetching unit.

Next, FIG. 2 is an oblique view showing the scanner in which a film holding unit of the type of holding a cartridge film is mounted in a film image fetching unit. FIG. 3 is an oblique view showing the scanner in which a film holding unit of the type of holding piece films or a strip film is mounted in the film image fetching unit.

The film image fetching unit 1 includes a ditch 1a in which the film holding unit 2 is mounted, an Eject button 1b used to detach the mounted film holding unit 2, and a Power switch 1c used to turn on the power supply.

As shown in FIG. 2, a cartridge film holding unit 2A serving as the film holding unit 2 and being mounted in the ditch 2 of the film image fetching unit 1 includes a cartridge cover 2a through which a film cartridge FC is loaded, a slide switch 2b for opening the cartridge cover 2a, and a Power switch 2c used to supply power to the cartridge film holding unit 2A.

As shown in FIG. 3, a 135 film holding unit 2B serving as the film holding unit 2 for holding piece films PF or a strip film SF and being mounted in the ditch 1a of the film image fetching unit 1 has a groove 2d in which a film holder 6 or 8 for 135 piece films PF or a 135 strip film SF which will be described later is fitted.

Each 135 piece film PF is enclosed within a mount 7. A plurality of 135 piece films PF enclosed with the mounts 7 are fitted into insert sections 6c of the film holder 6. The film holder 6 has a plurality of rectangular holes 6a enabling irradiation of illumination light to the 135 piece films PF and also enabling reading of images from the piece films. A reflectance pattern 6b serving as an identification means used to identify the kind of film is formed under each of the rectangular holes 6a.

The 135 strip film SF is fitted in the film holder 8. The film holder 8 has a plurality of rectangular holes 8a enabling irradiation of illumination light to the 135 strip film SF and also enabling reading of the images from the strip film. A reflectance pattern 8b serving as an identification means used to identify the kind of film is formed under each of the rectangular holes 8a.

Figure 4:
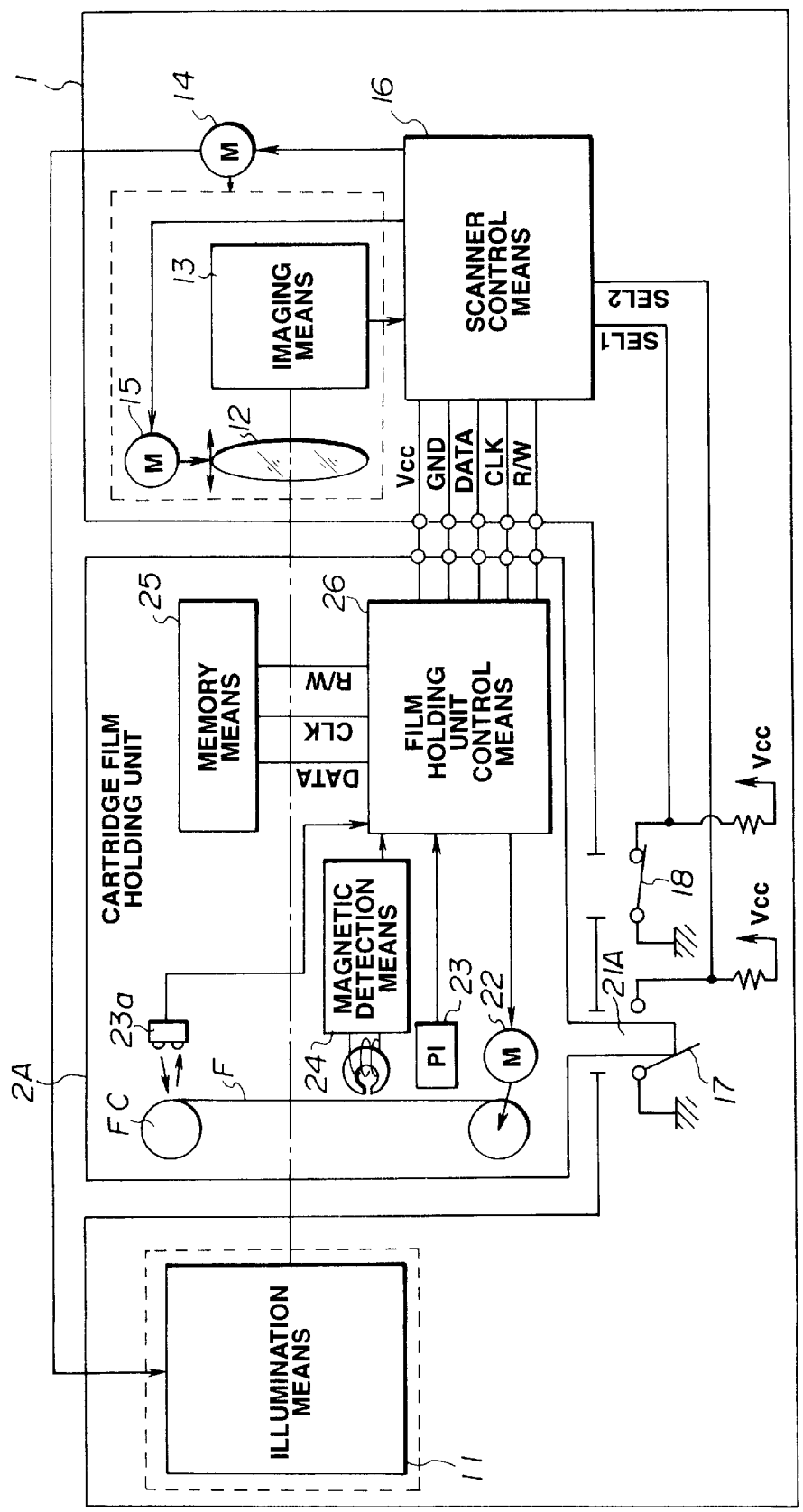
FIG. 4 is a block diagram showing the configuration of the scanner of the first embodiment with a cartridge film holding unit mounted in the film image fetching unit.
Figure 5:
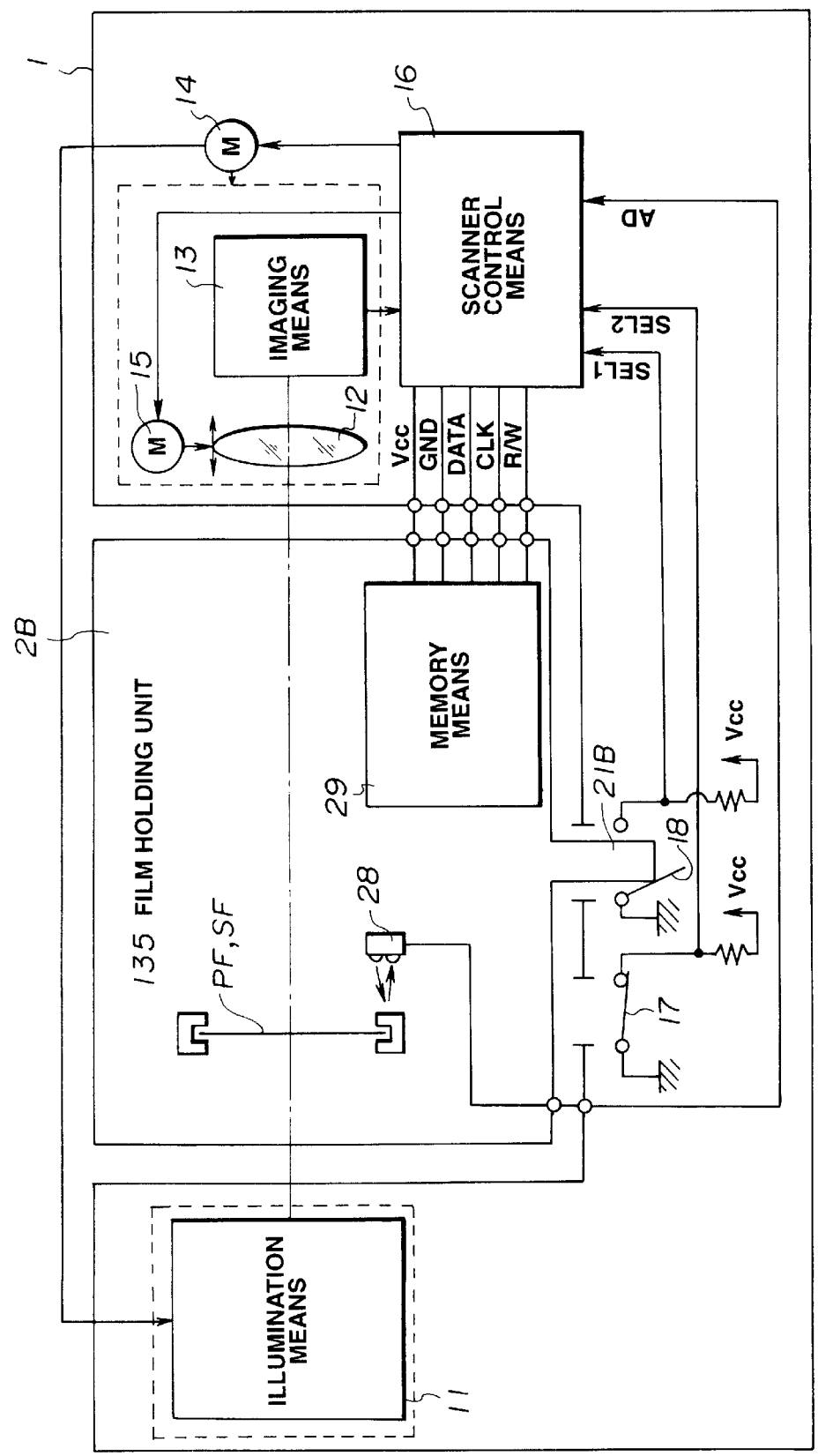
FIG. 5 is a block diagram showing the configuration of the scanner of the first embodiment with a 135 film holding unit mounted in the film image fetching unit.

FIG. 4 is a block diagram showing the configuration of the scanner with a cartridge film holding unit mounted in a film image fetching unit. FIG. 5 is a block diagram showing the configuration of the scanner with a 135 film holding unit mounted in the film image fetching unit.

In this embodiment, the film holding unit 2 is identified using an irregular member formed on the film holding unit 2.

The film image fetching unit 1 comprises: an illumination means 11 formed with, for example, a fluorescent lamp for illuminating film F, fixed to a lens-CCD holding member, which is not shown, extending under the film holding unit 2A or 2B, and interlocked with a lens 12 and imaging means 13 which will be described later; the lens 12 forming an image on film F illuminated by the illumination means 11; the imaging means 13 converts the film image formed by the lens 12 into an electric signal and is formed with, for example, a linear CCD; a motor 15 for focusing the lens 12, that is, for moving the lens 12 to a given focal position associated with the film holding means 2A or 2B or for setting the power of the lens 12 to a given power for zooming; a motor 14 formed with a stepping motor or the like for enabling the imaging means 13 to perform sub-scan by driving the lens-CCD holding member that is not shown; a switch 17 serving as an identification means and changing from an on state to an off state when pressed by a convex part 21A, which will be described later, of the cartridge film holding unit 2A; a switch 18 serving as an identification means and changing from an on state to an off state when pressed by a convex part 21B, which will be described later, of the 135 film holding unit 2B; and a scanner control means 16 responsible for control of the entire film image fetching unit 1 including the above circuits and for communication with the film holding unit 2A or 2B.

The lens-CCD holding member that is not shown is engaged with a screw shaft having a spiral groove and held movably by a guide shaft located parallel to the screw shaft. When the sub-scan motor 14 is driven, the screw shaft coupled via gears or the like rotates, and the lens-CCD holding member moves parallel to the axial direction of the shaft with the positional relationships among the illumination means 11, lens 12, and imaging means 13 retained intact. Sub-scan is then carried out.

The initial position and terminal position of the lens-CCD holding member are detected by a photosensor that is not shown. Based on the reference position thereof and the number of driving pulses provided by the motor 14, an absolute position of the lens-CCD holding member is detected. Thus, a lens CCD holding unit is prevented from colliding against a wall or the like.

The number of driving pulses that are provided by the motor 14 and that start with a driving pulse generated at the reference position is stored as information indicating a picture plane position of film in a memory means 25 or 29 that will be described later, and used to control the timing of fetching picture plane data from film or the timing of data transfer to a personal computer or the like. The memory means 25 or 29 is designed to store information specific to the film holding unit 2A or 2B and therefore normally incorporated in the film holding unit 2A or 2B.

An SEL1 terminal and an SEL2 terminal of the scanner control unit 16 are terminals for providing a two-bit signal that identifies the type of film holding unit 2. In this embodiment:

when the SEL1 is low and the SEL2 is high, the signal indicates a cartridge film holding unit;

when the SEL1 is high and the SEL2 is low, the signal indicates a 135 film holding unit; and when the SEL1 is low and the SEL2 is low, the signal indicates the absence of a film holding unit.

The other terminals of the scanner control means 16 are as follows:

the Vcc is assigned to a power line;

the GND is assigned to a ground line;

the DATA is assigned to a serial communication line;

the CLK is assigned to a clock line; and the R/W is assigned to a data transfer direction line.

The Vcc terminal is used to supply power from the film image fetching unit 1 to the film holding unit 2. The DATA terminal is used to transfer serial communication line data between the film holding unit 2 and film image fetching unit 1.

As for the R/W terminal:

when it is high, the direction of data transfer is from the film holding unit to the film image fetching unit; and when it is low, the direction of data transfer is from the film image fetching unit to the film holding unit.

The cartridge film holding unit 2A comprises: a motor 22 for feeding film F from the film cartridge FC and winding or rewinding it; a magnitude-of-film drive detection means 23 that includes a photo-interrupter gear interlocked with a rod member which rotates with the run of film F and a photo-interrupter for detecting interception or non-interception by the photo-interrupter gear, and that detects the magnitude of a run made by the film F by counting the number of output wave pulses; a detection means 23a for detecting film information that has been recorded optically on the face of the film cartridge FC or a disk attached to the film cartridge FC using a bar code or the like; a magnetic detection means 24 having a magnetic head or the like for reading magnetic information recorded on the film F; a film holding unit control means 26 responsible for various kinds of control of the cartridge film holding unit 2A and for various kinds of communications with the scanner control means 16; a memory means 25 for storing various kinds of information controlled by the film holding unit control means 26; and a convex part 21A serving as an identification means and indicating that the film holding unit 2 is the cartridge film holding unit 2A of the type of being loaded with the film cartridge FC when engaging with the switch 17 of the film image fetching unit 1.

Furthermore, the 135 film holding unit 2B comprises: a detection means 28 formed with a photo-reflector or the like for identifying the kind of film by detecting any of the reflectance patterns 6b or 8b indicating a loaded 135 piece film PF or 135 strip film SF; a memory means 29 for storing various kinds of information and transmitting information through various kinds of communications with the scanner control means 16; and a convex part 21B serving as an identification means and indicating that the film holding unit 2 is the cartridge film holding unit 2B of the type of being loaded with 135 piece films PF or a 135 strip film SF when engaging with the switch 18 of the film image fetching unit 1. Information detected by the detection means 28 is transmitted to the film image fetching unit 1 through electric contacts and input to the scanner control means 16 through an AD terminal.

Figure 6:
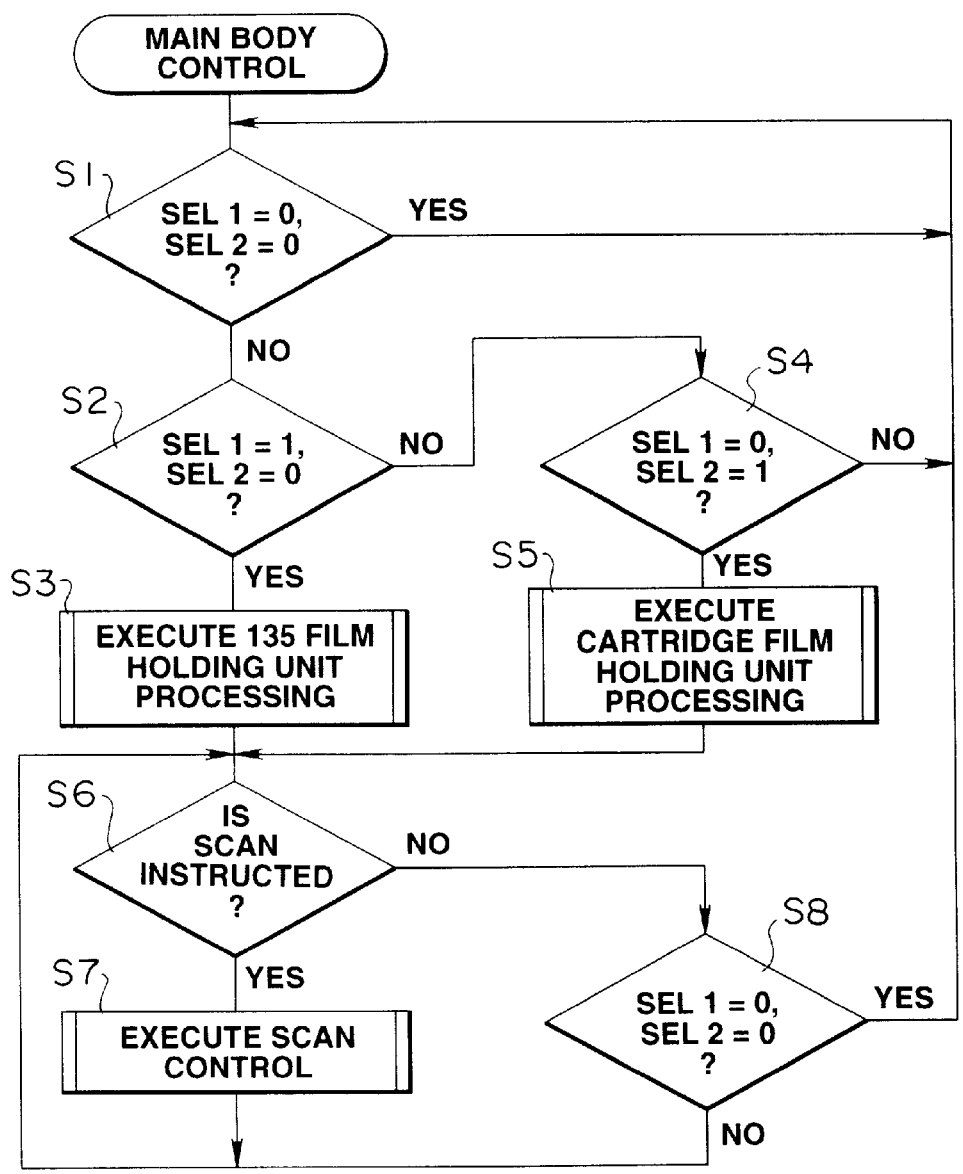
FIG. 6 is a flowchart describing a main operation of the film image fetching unit in the first embodiment.

FIG. 6 is a flowchart describing a main operation of the film image fetching unit 1.

When a main operation of the film image fetching unit 1 is started with supply of power or the like, the SEL1 or SEL2 terminal is checked to see if the film holding unit 2 is present (step S1). If the SEL1 bit represents a 0 (low level) and the SEL2 bit represents a 0 (low level), it is judged that a film holding unit 2 is not mounted. Step S1 is repeatedly executed, and thus a standby state is retained until a film holding unit 2 is mounted.

If it is judged that a film holding unit 2 is not mounted, a film image reading operation to be performed by executing Film Holding Unit Processing or Scan Control that will be described later is not carried out. The reading operation includes at least one of sub-scan by an imaging means and lighting of an illumination means.

If it is found at step S1 that the SEL1 bit does not represent a 0 (low level) and the SEL2 bit does not represent a 0 (low level), control is passed to an operation of checking the type of film holding unit 2 on the basis of the result of checking the SEL1 or SEL2 terminal.

In other words, it is judged whether or not the SEL1 bit represents a 1 (high level) and the SEL2 bit represents a 0 (low level) (step S2). If so, it is judged that the 135 film holding unit 2B has been mounted. 135 Film Holding Unit Processing is then executed (step S3).

By contrast, if it is found at step S2 that the SEL1 bit does not represent a 1 (high level) and the SEL2 bit does not represent a 0 (low level), it is judged that the SEL1 bit represents a 0 (low level) and the SEL2 bit represents a 1 (high level) (step S4). If not so, control is returned to step S1. If so, it is judged that the cartridge film holding unit 2A has been mounted. Cartridge Film Holding Unit Processing is then executed (step S5).

When step S3 or S5 has been completed, it is judged whether or not a scan start instruction is made using a Scan Start switch of the film image fetching unit 1 which is not shown or using an external unit such as a personal computer (step S6). If a scan start instruction is made, Scan Control is executed (step S7).

A range of image fetching performed with execution of Scan Control is defined by setting parameters at step S3 or S5. Thereafter, control is returned to step S6.

If it is found at step S6 that a scan start instruction is not made, it is judged whether or not the SEL1 bit represents a 0 (low level) and the SEL2 bit represents a 0 (low level) (step S8). If so, it is judged that the film holding unit 2 has been detached. Control is then returned to step S1. If not so, it is judged that the film holding unit 2 remains connected. Control is returned to step S7.

Figure 7:
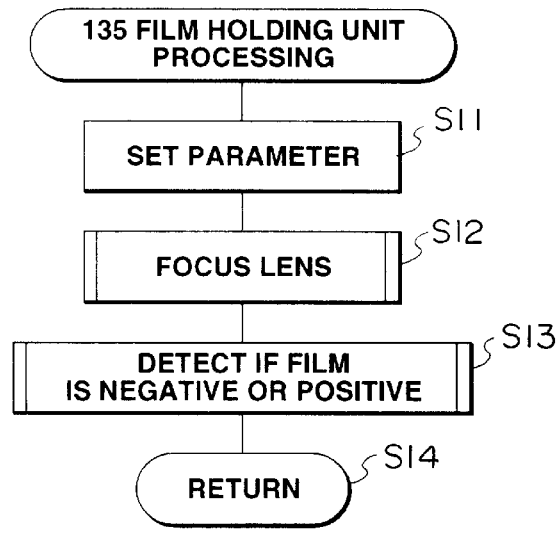
FIG. 7 is a flowchart describing an operation of the 135 film holding unit in the first embodiment.

FIG. 7 is a flowchart describing an operation of the 135 film holding unit 2B.

When processing for the 135 film holding unit 2B is started, first, a range of image fetching on 135 film (step S11) is defined by setting parameters.

To be more specific, the parameter setting is such that pixel numbers on the imaging means 13 formed with a CCD or the like, and the numbers of driving pulses starting with a driving pulse generated at the reference position and being provided by the sub-scan motor 14 formed with a stepping motor or the like are set in relation to the start position and end position of image fetching in a main scan direction and the start position and end position of image fetching in a sub-scan direction. Furthermore, a focal position for a 135 film is defined by setting parameters, and thus the magnitude of a focus drive made by the focus motor 15 relative to the reference position is determined.

Thereafter, the motor 15 is controlled according to the parameters, whereby the lens 12 is driven to a given focal position (step S12).

Based on the sizes of color components of R, G, and B outputs of the imaging means 13 corresponding to the color of a film base and the ratio of the sizes, it is detected whether the film is a negative or positive (step S13).

That is to say, the base of a positive is substantially black, while the base of a negative is substantially orange. A positive and negative can therefore be distinguished from each other in terms of the sizes of color components of R, G, and B outputs and the ratio of the sizes.

A means for distinguishing a negative from a positive is not limited to the foregoing one. Alternatively, any of the reflectance patterns 6b or 8b shown in FIG. 3 may be detected by the detection means 28 formed with a photo-reflector or the like as shown in FIG. 5. The output of the detection means 28 is converted into digital data, and then it is judged from the value of the digital data whether a film is a negative or positive. Using this alternative means, since an object of detection is very stable in terms of position and output, the mechanism would be simpler than that of the aforesaid means and the reliability would be higher. This is advantageous.

When step S13 has been completed, control is returned to the main routine and the processing is terminated (step S14).

Figure 8:
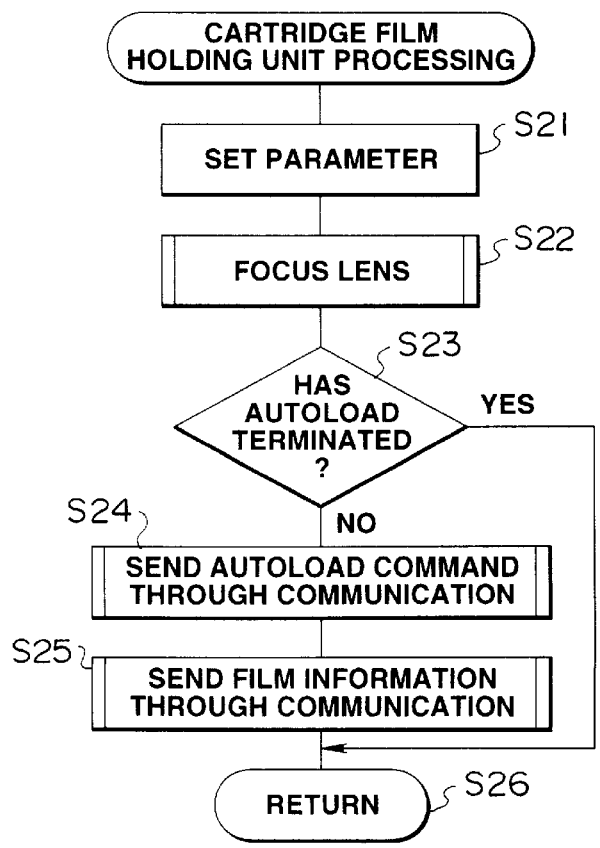
FIG. 8 is a flowchart describing an operation of the cartridge film holding unit in the first embodiment.

FIG. 8 is a flowchart describing an operation of the cartridge film holding unit 2A.

When the processing for the cartridge film holding unit 2A is started, a range of image fetching on cartridge film is defined by setting parameters (step S21).

To be more specific, the parameter setting is such that pixel numbers on the imaging means 13 formed with a CCD or the like, and the numbers of driving pulses starting with a driving pulse generated at the reference position and being provided by the sub-scan motor 14 formed with a stepping motor or the like are set in relation to the start position and end position of image fetching in a main scan direction and the start position and end position of image fetching in a sub-scan direction. Furthermore, a focal position for a cartridge film is defined by setting parameters, and thus the magnitude of a focus drive made by the focus motor 15 relative to the reference position is determined.

Thereafter, the motor 15 is controlled according to the parameters, whereby the lens 12 is driven to a given focal position (step S22).

The scanner control means 16 communicates with the cartridge film holding unit 2A so as to read an Autoload flag (that is set when Autoload succeeds and reset when Rewind is completed) written in the memory means 25 incorporated in the cartridge film holding unit 2A, and thus judges whether or not Autoload has terminated (step S23).

If Autoload has terminated, control is jumped to step S26 that will be described later, and returned to the main routine. If Autoload has not terminated, an Autoload command is sent to the cartridge film holding unit 2A through communication (step S24).

In response to the command, the cartridge film holding unit 2A pulls the film F out of the film cartridge FC, and winds the film until the first frame comes in position. After the winding is completed, the Autoload flag is set.

During Autoload, the magnetic detection means 24 reads film information such as negative/positive information recorded in the header of film as magnetic information, and the number of film frames. An alternative method of reading film information is such that film information is optically recorded on the face of a cartridge of a disk attached to the cartridge in advance using a bar code or the like, and then detected using the detection means 23a.

The film information is then sent from the cartridge film holding unit 2A to the film image fetching unit 1 through communication (step S25).

When step S25 has been completed, control is returned to the main routine and the processing is terminated (step S26).

Figure 9:
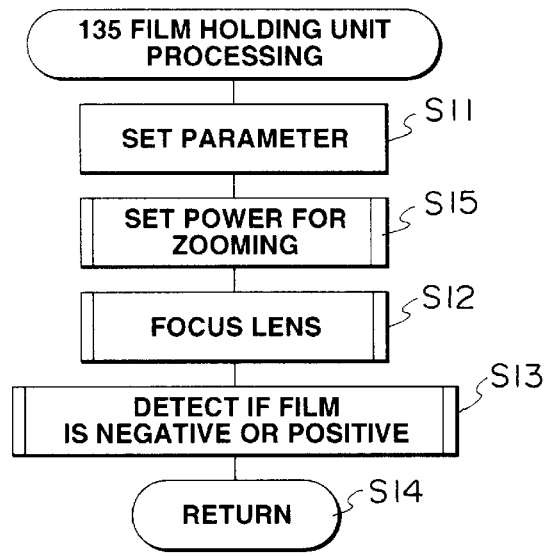
FIG. 9 is a flowchart describing a variant of the operation of the 135 film holding unit shown in FIG. 7.
Figure 10:
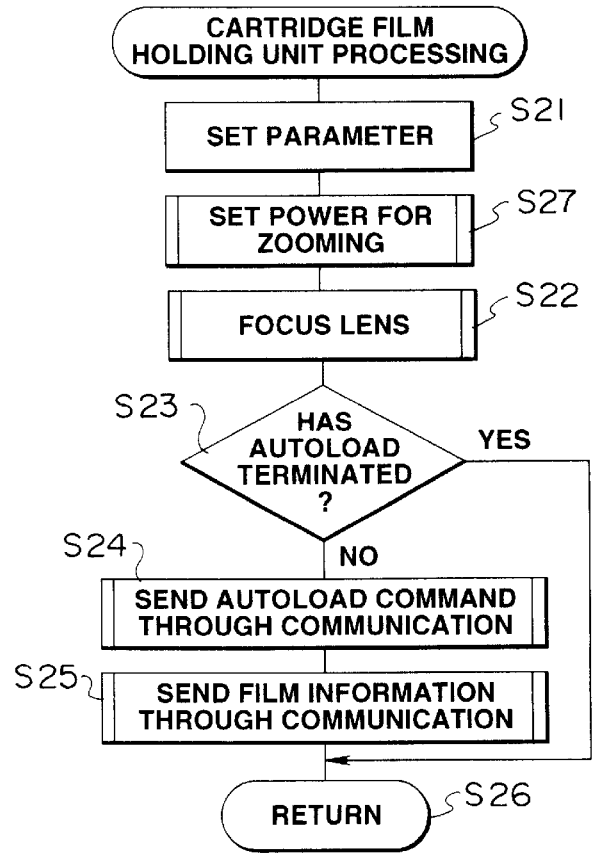
FIG. 10 is a flowchart describing a variant of the operation of the cartridge film holding unit shown in FIG. 8.

FIGS. 9 and 10 are flowcharts describing a variant of the operation of the film holding unit 2A or 2B shown in FIG. 7 or 8. In FIGS. 9 and 10, steps whose contents are identical to those shown in FIGS. 7 and 8 will be assigned the same reference numerals. A description of the like-numbered steps will be omitted.

In the processing for the film holding unit 2A or 2B, after parameters are set at step S11 or S21, the power of the lens 12 is set to a given power for zooming by moving the lens 12 (step S15 or S27). More particularly, the motor 15 is controlled according to the parameters set at step S11 or S21, whereby the lens 12 is driven to the given power for zooming. After the power for zooming is thus set, control is passed to step S12 or S22 and focus is carried out.

Thus, even if the size of images is different among different kinds of film, images can automatically be read from film with an optimal size.

According to the first embodiment, although it has been necessary in the past to perform setting dependent on the type of film holding unit every time the film holding unit is mounted in a film image fetching unit, the necessity is obviated to improve maneuverability. Moreover, a user need not set film information for each kind of film and is therefore released from a bother.

Furthermore, reflectance patterns are formed on a film holder as an identification means, the film image fetching unit detects any reflectance pattern, and then executes a sequence associated with a result of the detection automatically. Compared with the technique of detecting the color of a film base, this technique makes it possible to judge on a stable basis using a relatively simple mechanism if the kind of film is a negative or positive.

Figure 11:
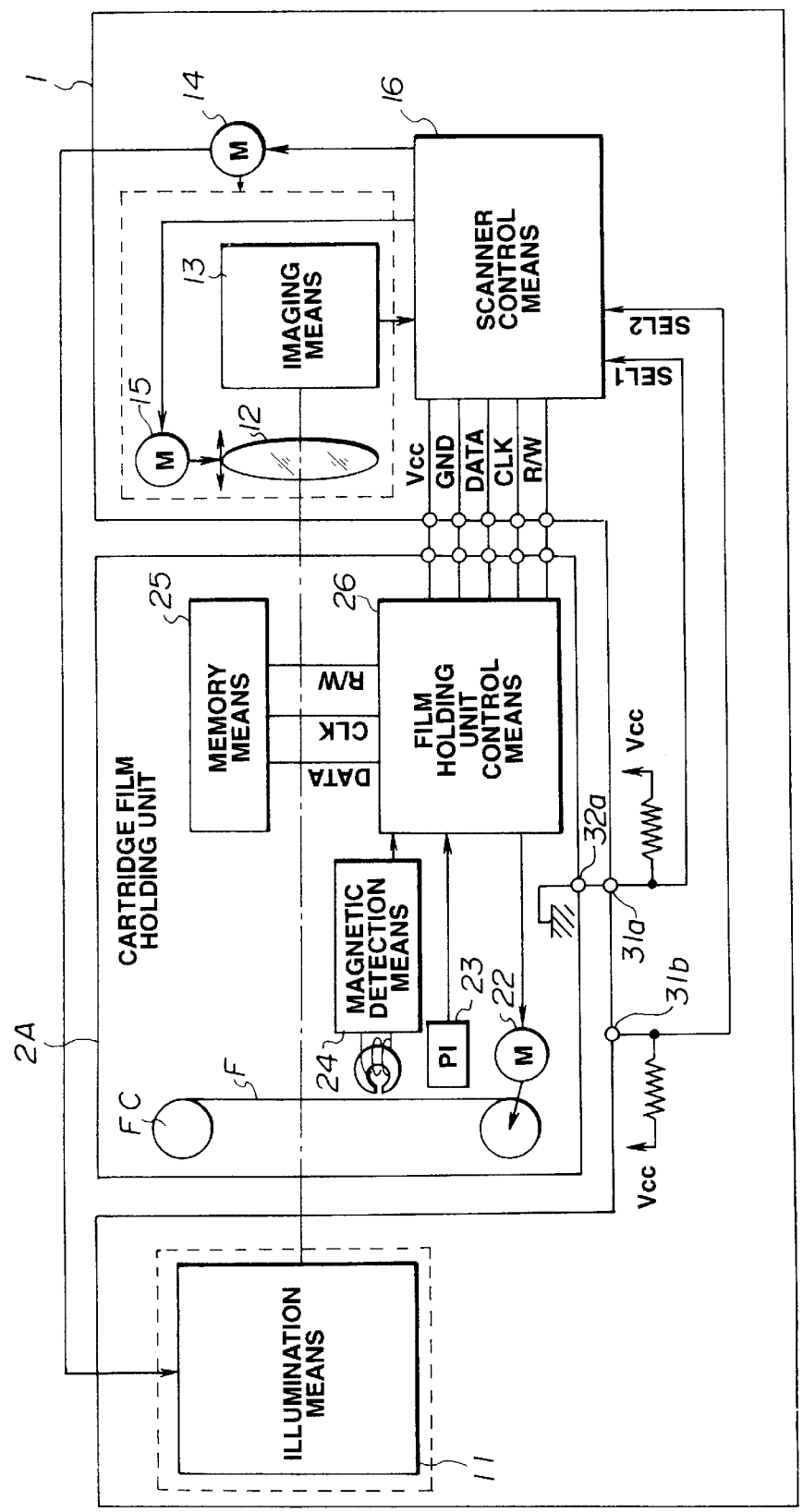
FIG. 11 is a block diagram showing the configuration of a scanner of a second embodiment of the present invention in which a cartridge film holding unit is mounted in a film image fetching unit.
Figure 12:
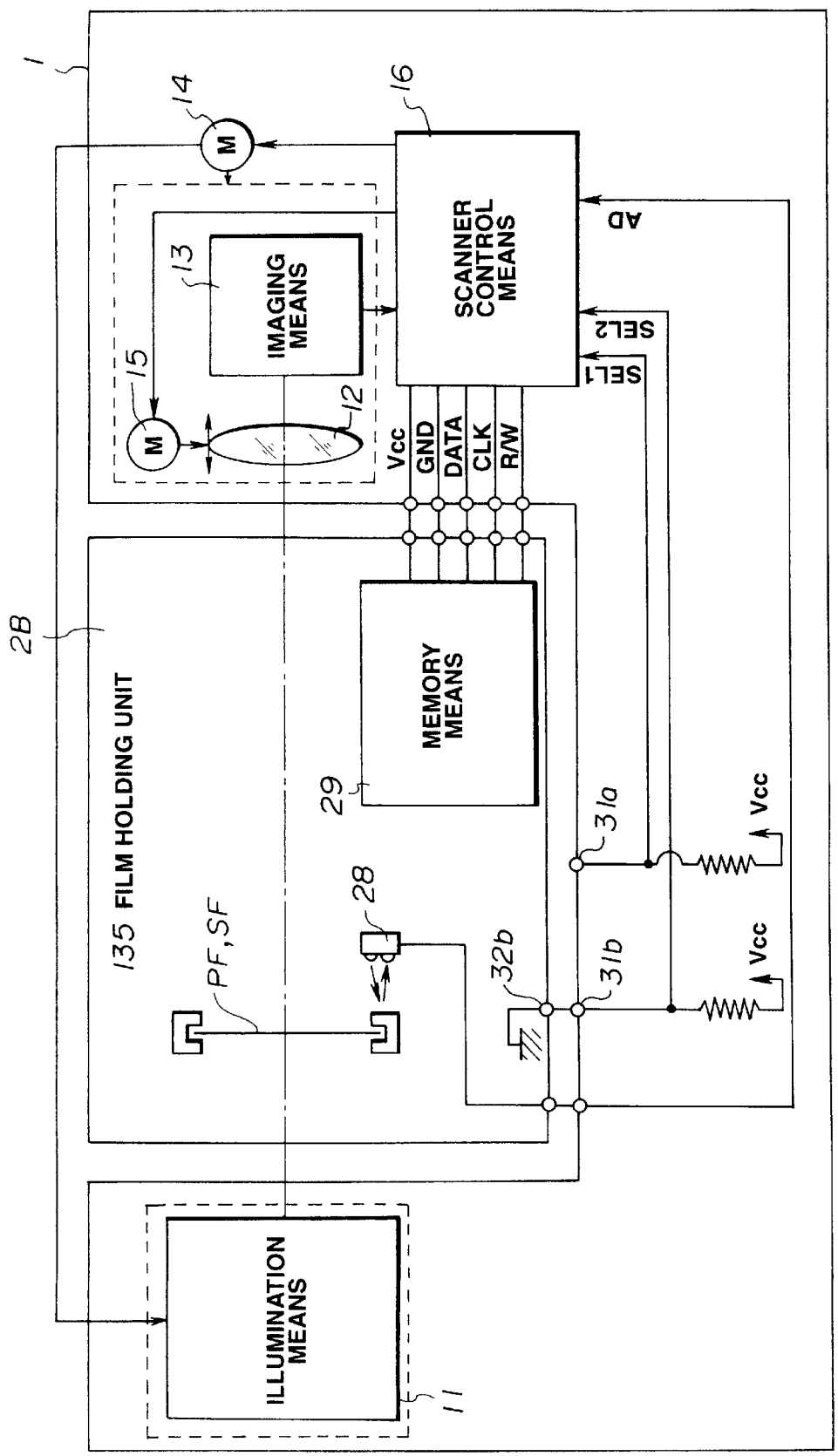
FIG. 12 is a block diagram showing the configuration of the scanner of the second embodiment with a 135 film holding unit mounted in the film image fetching unit.

FIGS. 11 and 12 show the second embodiment of the present invention. FIG. 11 is a block diagram showing the configuration of a scanner with a cartridge film holding unit mounted in a film image fetching unit. FIG. 12 is a block diagram showing the configuration of a scanner with a 135 film holding unit mounted in the film image fetching unit.

In the second embodiment, components identical to those in the first embodiment will be assigned the same reference numerals. A description of like-numbered components will be omitted and only a difference will be described mainly.

In the scanner of this embodiment, electric contacts are formed in order to identify the film holding unit 2.

Specifically, the film image fetching unit 1 has the switches 17 and 18 in the first embodiment. In this embodiment, an electric contact 31a serving as an identification means for detecting the cartridge film holding unit 2A and an electric contact 31b serving as an identification means for detecting the 135 film holding unit 2B are formed.

The cartridge film holding unit 2A is provided with an electric contact 32a serving as an identification means, and the 135 film holding unit 2B is provided with an electric contact 32b serving as an identification means.

Owing to the foregoing configuration, when neither the film holding unit 2A nor 2B is connected to the film image fetching unit 1, in this embodiment, the SEL1 terminal is driven high and the SEL2 terminal is also driven high. This allows the scanner control means 16 to recognize this fact.

When the cartridge film holding unit 2A is mounted in the film image fetching unit 1, the electric contact 32a comes into electrical contact with the electric contact 31a. Similar to the first embodiment, the SEL1 terminal goes low and the SEL2 terminal goes high. The scanner control means 16 can recognize that what is mounted is the cartridge film holding unit 2A.

When the 135 film holding unit 2B is mounted in the film image fetching unit 1, the electric contact 32b comes into electrical contact with the electric contact 31b. Similar to the first embodiment, the SEL1 terminal goes high and the SEL2 terminal goes low. The scanner control means 16 can recognize that what is mounted is the 135 film holding unit 2B.

As mentioned above, in this embodiment, when the film holding unit 2 is unconnected, both the SEL1 and SEL2 terminals go high unlike in the first embodiment. Relevant control is, needless to say, given accordingly.

According to the second embodiment, the employment of electric contacts makes it possible to provide substantially the same advantage as the first embodiment.

Figure 13:
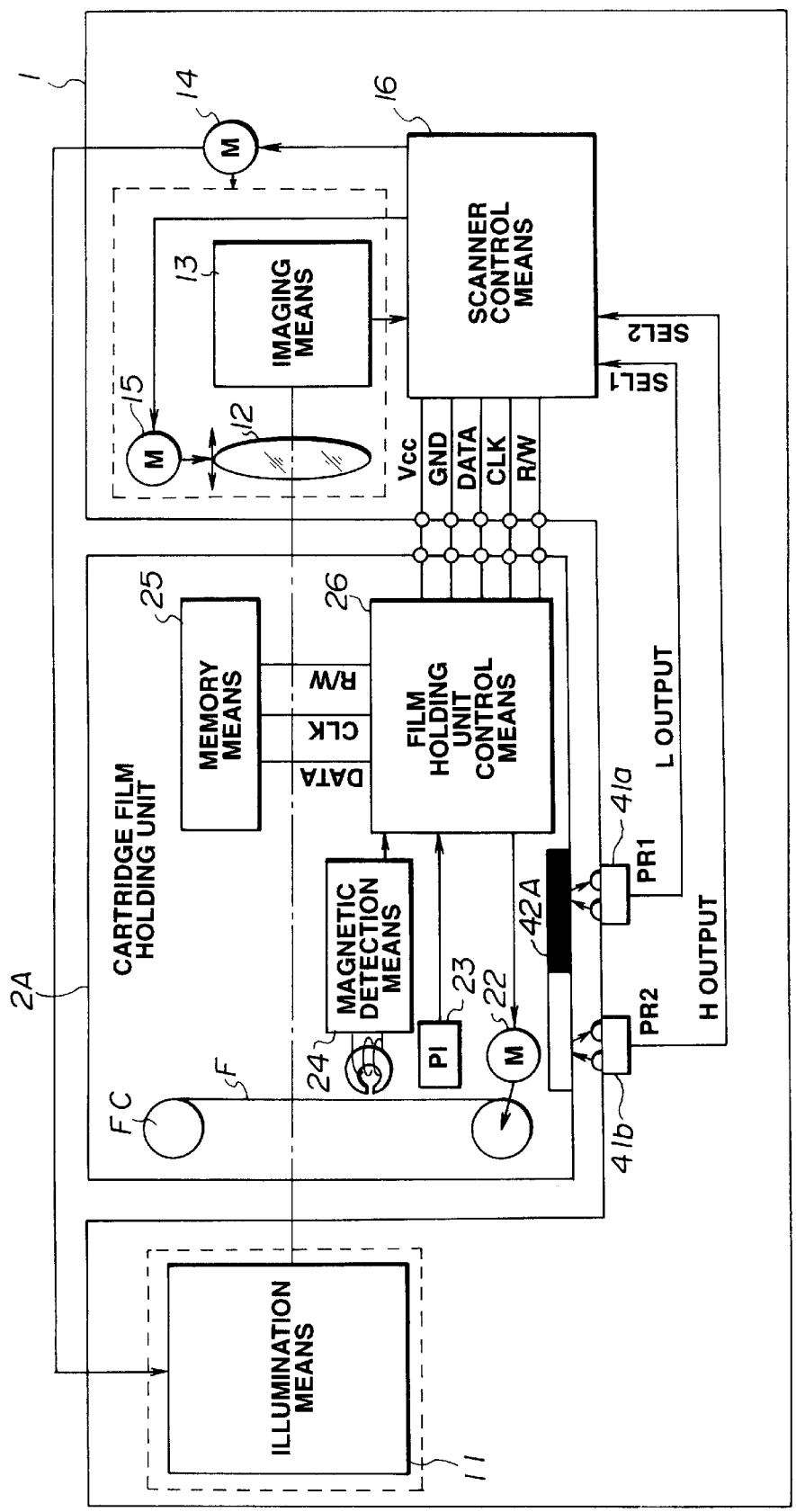
FIG. 13 is a block diagram showing the configuration of a scanner of a third embodiment of the present invention in which a cartridge film holding unit is mounted in a film image fetching unit.
Figure 14:
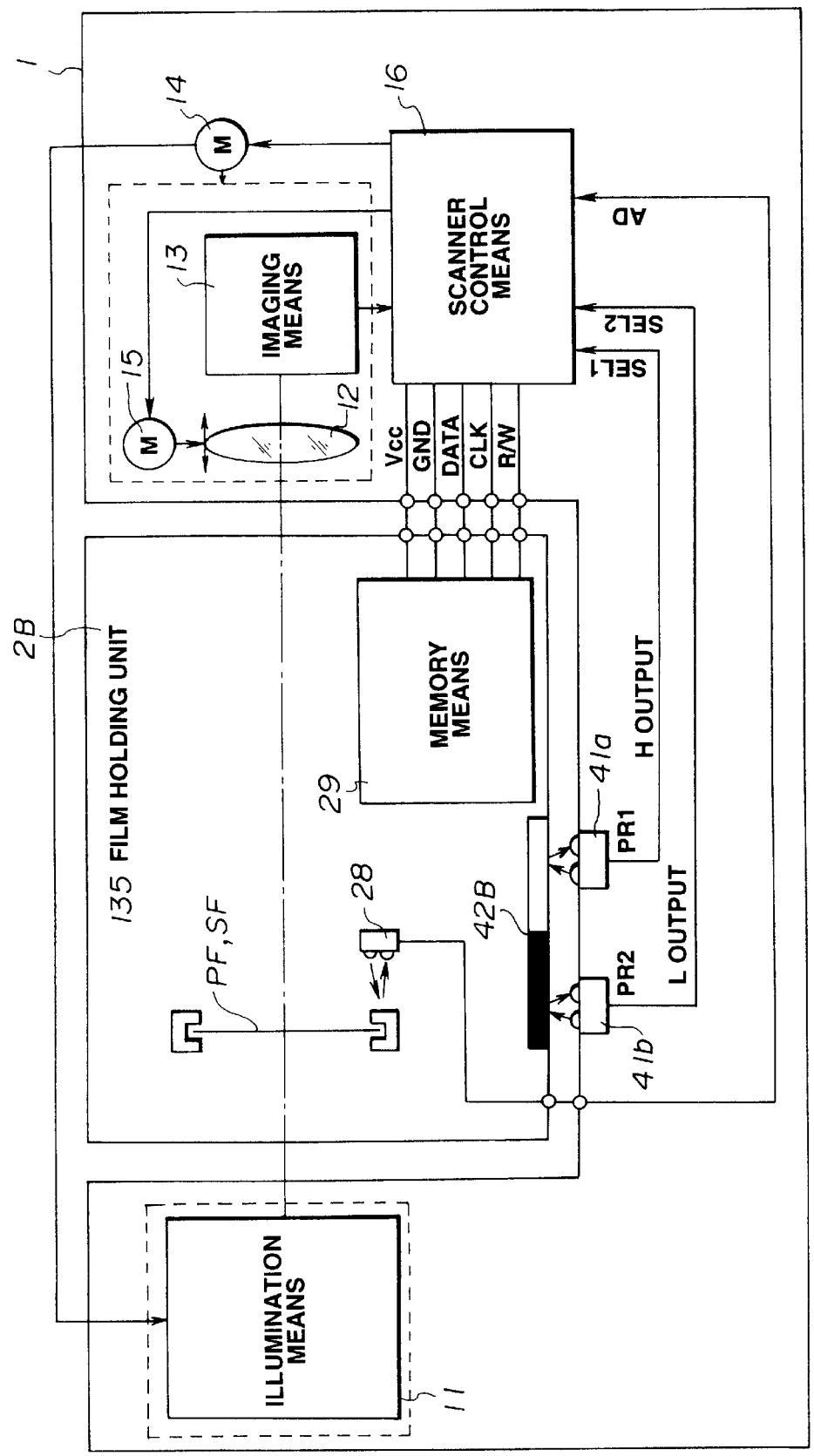
FIG. 14 is a block diagram showing the configuration of the scanner of the third embodiment with a 135 film holding unit mounted in the film image fetching unit.

FIGS. 13 and 14 show the third embodiment of the present invention. FIG. 13 is a block diagram showing the configuration of a scanner with a cartridge film holding unit mounted in a film image fetching unit. FIG. 14 is a block diagram showing the configuration of a scanner with a 135 film holding unit mounted in the film image fetching unit.

In the third embodiment, components identical to those in the first and second embodiments will be assigned the same reference numerals. A description of like-numbered components will be omitted and only a difference will be described mainly.

In the scanner of this embodiment, for identifying the film holding unit 2, a member having different reflectances is included to be detected optically.

Specifically, the film image fetching unit 1 is provided with a photo-reflector 41a serving as an identification means and being connected to the SEL1 terminal, and a photo-reflector 41b serving as an identification means and being connected to the SEL2 terminal.

The cartridge film holding unit 2A is provided with a reflection pattern 42A serving as an identification means. The reflection pattern 42A has one half thereof opposed to the photo-reflector 41a painted in low-reflectance color (for example, black) and the other half thereof opposed to the photo-reflector 41b painted in high-reflectance color (for example, white).

By the way, the 135 film holding unit 2B is provided with a reflection pattern 42B serving as an identification means. The reflection pattern 42B has one half thereof opposed to the photo-reflector 41a painted in high-reflectance color (for example, white) and the other half thereof opposed to the photo-reflector 41b painted in low-reflectance color (for example, black).

In this configuration, by checking the SEL1 and SEL2 terminals, the scanner can identify the presence or absence of a film holding unit or the type of connected film holding unit 2.

According to the third embodiment, optically detecting a reflection pattern makes it possible to provide substantially the same advantage as the first and second embodiments.

Figure 15:
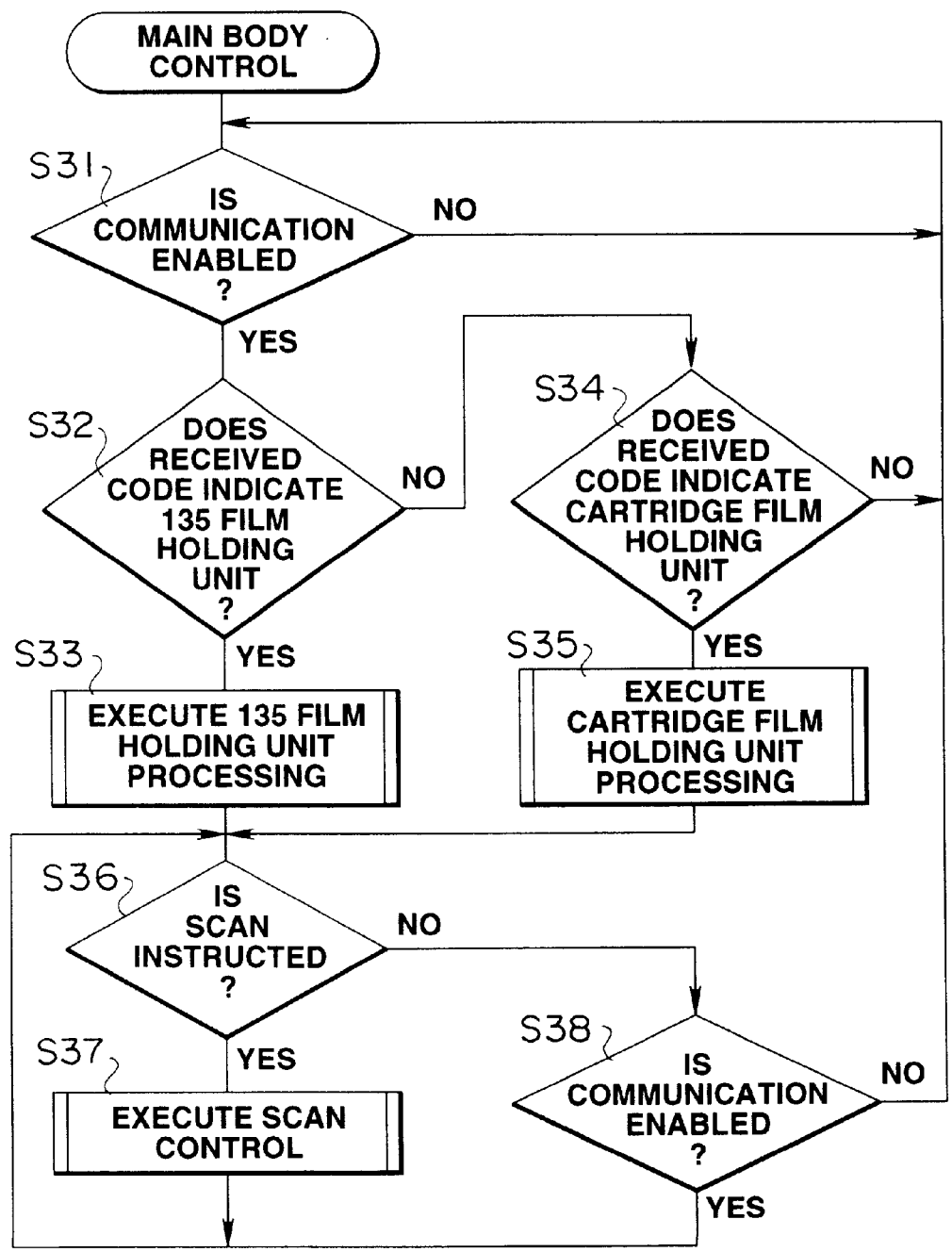
FIG. 15 is a flowchart describing a main operation of a film image fetching unit in a fourth embodiment of the present invention.

FIG. 15 shows the fourth embodiment of the present invention and is a flowchart describing a main operation of a film image fetching unit. In the fourth embodiment, a description of the components identical to those in the first to third embodiments will be omitted and only a difference will be described mainly.

In this embodiment, the film holding unit 2 is identified by reading a code written in a memory means formed with an EEPROM, ROM, or the like and incorporated in the film holding unit 2, for example, a memory means 25 in the cartridge film holding unit 2A or a memory means 29 in the 135 film holding unit 2B. That is to say, in this embodiment, the memory means 25 or memory means 29 serves as an identification means. The configuration of the fourth embodiment is substantially identical to that of the first embodiment.

When the film image fetching unit 1 starts operating, an attempt is made to read information from the film holding unit 2 through serial communication. Data is then checked to see if communication is enabled. The presence or absence of the film holding unit 2 is thus checked (step S31).

If all bits of the received data represent a low level, it is judged that the film holding unit 2 is not mounted. Step S31 is executed repeatedly, whereby a standby state is retained until the film holding unit 2 is mounted.

If it is judged that the film holding unit 2 is not mounted, a film image reading operation to be performed by executing Film Holding Unit Processing or Scan Control, which will be described later, is not carried out. The reading operation includes at least one of sub-scan by an imaging means and lighting of an illumination means.

If it is found at step S31 that at least one bit of the received data does not represent the low level, a received code output from the memory means in the film holding unit 2 is checked to identify the type of mounted film holding unit 2 (step S32).

If the received code is a 135 code, it is judged that the 135 film holding unit 2B has been mounted. 135 Film Holding Unit Processing is then executed (step S33).

If it is found at step S32 that the received code is not the 135 code, the received code output from the memory means in the film holding unit 2 is checked to see if the film holding unit 2 is the cartridge film holding unit 2A (step S34).

At this time, if the received code is not a cartridge code, control is returned to step S31. By contrast, if the received code is the cartridge code, it is judged that the cartridge film holding unit 2A has been mounted. Cartridge Film Holding Unit Processing is then executed (step S35).

When step S33 or S35 has been completed, it is judged whether or not a scan start instruction is made using a Scan Start switch, which is not shown, included in the film image fetching unit or using an external unit such as a personal computer (step S36). If a scan start instruction is made, Scan Control is executed (step S37). Thereafter, control is returned to step S36.

If it is found at step S36 that a scan start instruction is not made, serial communication is performed in order to check a received code to see if the film holding unit 2 has been mounted (step S38).

In other words, if all bits of the received code represent a low level, it is judged that the film holding unit 2 has been detached. Control is then jumped to step S31. If at least one bit of the received code does not represent the low level, it is judged that the film holding unit 2 remains mounted. Control is then jumped to step S36.

According to the fourth embodiment, the same advantage as that provided by the first to third embodiments can be provided. Moreover, the members such as the irregular member, electric contacts, and amount-of-reflected light detection means are unnecessary. A simpler and less expensive configuration can be realized.

As a variant of the fourth embodiment, information specific to a film holding unit may be stored in a memory means in addition to an identification code of the film holding unit, and the film holding unit may be driven according to the read information. The specific information includes a film driving sequence, a range of image fetching, a lens position for focus, and a desired power for zooming.

Owing to this configuration, when the number of kinds of films increases, if an unprecedented film holding unit is mounted in a film image fetching unit, control optimal to the film holding unit can be given readily.

In the present invention, it is apparent that a wide range of different embodiments can be formed on the basis of this invention without a depart from the spirit and scope of the invention. This invention is not restricted to any specific embodiment and is limited only to the appended claims.

What is claimed is:

1. A scanner, comprising:
a film image fetching unit for reading images from developed film; and
a film holding unit freely attachable and detachable to and from said film image fetching unit,
wherein types of said film holding unit include:
a first adaptor comprising means for stowing a film in a cartridge and sending out said film from said cartridge and means for winding the film sent out from the cartridge; and
a second adaptor having no film feeding means or winding means, and
said film fetching unit having a means for receiving a film holding unit;
wherein said film image fetching unit identifies a type of film holding unit inserted into said receiving means and controls the film fetching unit according to the identified film holding unit inserted into the receiving means.

2. A scanner, comprising:
a film image fetching unit for reading images from developed film;
a plurality of different film holding units freely attachable and detachable to and from said film image fetching unit; and
wherein the types of said film holding units include:
a first adaptor comprising means for stowing the film in the cartridge and sending out said film from the cartridge and means for winding the film sent out from the cartridge; and
a second adaptor having no film feeding means or winding means, and
said film fetching unit having a means for receiving a film holding unit;
an identification means for identifying the type of film holding inserted into said receiving means.

3. A scanner according to claim 2, wherein said identification means includes a different projection formed on each of said film holding units and switch members included in said film image fetching unit and selectively activated when engaged with said projection.

4. A scanner according to claim 2, wherein said identification means includes an electric contact pattern formed on each of said film holding units and a means included in said film image fetching unit for identifying said electric contact pattern.

5. A scanner according to claim 2, wherein said identification means includes a member formed on each of said film holding units and having different reflectances, and a means included in said film image fetching unit for detecting reflectances of said member.

6. A scanner, comprising:
a film image fetching unit for reading images from developed film; and
a film holding unit freely attachable and detachable to and from said film image fetching unit,
wherein types of said film holding unit include:
a first adaptor comprising means for stowing a film in a cartridge and sending out said film from said cartridge and means for winding the film sent our from the cartridge; and
a second adaptor having no film feeding means or winding means, and
said film fetching unit having a means for receiving a film holding unit;
wherein said film image fetching unit identifies a type of film holding unit inserted into said receiving means and controls the film fetching unit according to the identified film holding unit inserted into the receiving means;
said film fetching unit further including a memory means included in each of said film holding units for storing identification information, and said identification information stored in said memory means is transmitted to said film image fetching unit through communication means for identifying a type of film holding unit.

7. A scanner according to claim 6, further comprising an identification means in said fetching unit coupled to said communication means for identifying a kind of film based on stored identification information.

8. A scanner according to claim 6, wherein said second adaptor has a groove for receiving a plurality of adaptors each for holding a different kinds of films.

9. A scanner according to claim 6, wherein said film fetching unit is controlled so that when said identification means senses that one of said film holding units has been mounted in said film image fetching unit, a given range of an image associated with the type of film holding unit can be read.

10. A scanner, comprising:
a scanner main unit for reading images from developed film;
a plurality of different adaptors each capable of being freely detachably attached to said scanner main unit and holding a film stowed in a cartridge or other films;
an identification mechanism for identifying each of said adaptors, wherein:
one adaptor for holding said film stowed in a cartridge among said plurality of different adaptors including a film feeding means and winding means fully contained within said one adaptor; and
when one of said adaptors is mounted in said scanner main unit, said identification mechanism recognizes an adaptor, and said feeding means feeds said film responsive to a type of adaptor identified by said identification mechanism.

11. A scanner, comprising:
a film image fetching means for reading images from a developed film;
a plurality of different film holding means being freely attachable and detachable to and from said film image fetching means and having inherent identification signals;

said main unit having means for receiving an adaptor;
an identification means for identifying the film holding means received by said receiving means,
wherein said scanner gives inherent control according to information provided by said identification means; and
said scanner inherent control sets a focal position of said scanner.

12. A scanner according to claim 11, wherein said inherent control sets a range of image reading sets start positions and end positions of a main scan and sub-scan of an imaging means.

13. A scanner according to claim 11, wherein said scanner inherent control also controls a film feeding mechanism according to the film holding unit detected.

14. A scanner, comprising:
a film image fetching means for reading images from a developed film;
a plurality of different film holding means being freely attachable and detachable to and from said film image fetching means and having inherent identification signals;
said main unit having means for receiving an adaptor;
an identification means for identifying the film holding means received by said receiving means,
wherein said scanner gives inherent control according to information provided by said identification means; and
said scanner inherent control permits execution of setting of a focal position of said scanner.

15. A scanner, comprising:
a film image fetching means for reading images from a developed film;
a plurality of different film holding means being freely attachable and detachable to and from said film image fetching means and having inherent identification signals;
said main unit having means for receiving an adaptor;
an identification means for identifying the film holding means received by said receiving means,
wherein said scanner gives inherent control according to information provided by said identification means; and
said scanner inherent control permits setting of a power for zooming of said scanner.

16. A scanner, comprising:
a film image fetching means for reading images from a developed film;
a plurality of different film holding means being freely attachable and detachable to and from said film image fetching means and having inherent identification signals;
said main unit having means for receiving an adaptor;
an identification means for identifying the film holding means received by said receiving means,
wherein said scanner gives inherent control according to information provided by said identification means; and
said scanner inherent control permits execution of setting of a range of image reading, setting of a focal position, and setting of a power zooming of said scanner responsive to a type of adaptor received by said receiving means.

17. A scanner comprising:
a film image fetching unit for reading images from developed film;
a plurality of different types of film holding units freely attachable or detachable to or from said film image fetching unit;
wherein the types of said film holding units are the following ones:
a first adaptor comprising means for stowing a first film in a cartridge and sending out said film from the cartridge and means for winding the film sent out from the cartridge all fully contained within said first adaptor; and
a second adaptor for stowing a second film with images of which the size is different from that of images of said first film and having no feeding means or winding means of said film,
a receiving device on said fetching unit for receiving an adaptor, and
an identification means for identifying the types of said film holding units and identifying the received adaptor,
wherein said scanner sets a power for zooming in correspondence with the sizes of the images of said respective films based on information derived from said identifying means.

18. A scanner, comprising:
a film image fetching unit for reading images from developed film; and
a film holding unit freely attachable and detachable to and from said film image fetching unit,
wherein types of said film holding unit include:
a first adaptor comprising means for stowing a film in a cartridge and sending out said film from said cartridge and means for winding the film sent out from the cartridge; and
a second adaptor having no film feeding means or winding means, and
said film fetching unit having a means for receiving a film holding unit;
wherein said film image fetching unit identifies a type of film holding unit inserted into said receiving means and controls the film fetching unit according to the identified film holding unit inserted into the receiving means; and
said receiving means comprises a recess in a housing for the fetching unit said recess being open at a top thereof;
said adaptors being placed into said recess.

19. A scanner according to claim 18 wherein said recess has first and second spaced apart sidewalls and base, said first sidewall having a projection extending toward said second sidewall;
said adaptors each having a housing with a pair of opposing outer walls of a shape conforming to the first and second sidewalls of said receiving means to retain the adaptor in proper alignment with the fetching unit when placed in said recess.

20. A scanner according to claim 19 wherein one of said adaptors has a receiving slot; and
at least one film holder for holding film containing at least one image being inserted into said slot.

21. A method for operating a scanner for selectively receiving a plurality of different film holding units and having a film image fetching means for reading images from a developed film in a film holding unit mounted to said scanner, each film holding unit having a unique identification portion, said method comprising the steps of:
a) detecting the film holding unit mounted on said scanner;
b) setting parameters for an image to be scanned responsive to the detected film holding unit; and c) adjusting a lens to focus an image on a film in said film holding unit on an imaging device preparatory to scanning responsive to the detected film holding unit.

22. The method of claim 21 wherein at least one of said film holding units is a cartridge film holding unit having a take-up means and a film driving unit and control means therefor filly contained within the cartridge film holding unit, said method further comprising the step of communicating to said film holding unit from said scanner to control film feeding in the cartridge film holding unit.

23. The method of claim 21 wherein when a film holding unit contains one of a strip film and piece film, said method further comprises determining if the film in the holding unit is negative or positive.

24. The method of claim 21 further comprises the step of zooming the focusing lens responsive to the film holding unit mounted on the scanner.

25. The method of claim 21 wherein said film holding units have different projections, said method further comprising the step of detecting which projection is present in order to identify a film holding unit mounted on said scanner.

26. The method of claim 21 wherein each of said film holding units has different reflectance patterns and step (a) further comprises detecting a reflectance pattern to identify a film holding unit.

* * * * *

UNITED STATES PATENT AND TRADEMARK OFFICE
CERTIFICATE OF CORRECTION

PATENT NO.    : 6,195,182 B1
DATED         : February 27, 2001
INVENTOR(S)   : Keiji Kunishige It is certified that error appears in the above-identified patent and that said Letters Patent is hereby corrected as shown below:

<u>Column 3,</u>
Line 66, after the word "enclosed", delete "with" and insert therefor -- within --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*